US012692390B2

(12) United States Patent
Badel

(10) Patent No.: US 12,692,390 B2
(45) Date of Patent: Jul. 28, 2026

(54) POLYAMIDE COMPOSITION COMPRISING A FLAME RETARDANT POLYESTER AND METHOD FOR PREPARING IT

(71) Applicant: POLYTECHNYL SAS, Paris (FR)

(72) Inventor: Thierry Badel, Lyons (FR)

(73) Assignee: POLYTECHNYL SAS, Paris (FR)

( * ) Notice: Subject to any disclaimer, the term of this patent is extended or adjusted under 35 U.S.C. 154(b) by 1048 days.

(21) Appl. No.: 17/758,912

(22) PCT Filed: Jan. 29, 2021

(86) PCT No.: PCT/EP2021/052130
§ 371 (c)(1),
(2) Date: Jul. 15, 2022

(87) PCT Pub. No.: WO2021/152105
PCT Pub. Date: Aug. 5, 2021

(65) Prior Publication Data

US 2023/0087116 A1 Mar. 23, 2023

(30) Foreign Application Priority Data

Jan. 29, 2020 (EP) .................................... 20305077

(51) Int. Cl.
*C08L 77/06* (2006.01)

(52) U.S. Cl.
CPC .................................... *C08L 77/06* (2013.01)

(58) Field of Classification Search
CPC ...................................................... C08L 77/06
See application file for complete search history.

(56) References Cited

U.S. PATENT DOCUMENTS 7,342,061 B2 * 3/2008 Mueller ............ C07F 9/657172
524/121
8,470,916 B2 6/2013 Glauner et al.

FOREIGN PATENT DOCUMENTS

WO 2018197173 A1 11/2018

* cited by examiner

*Primary Examiner* — Michael F Pepitone
(74) *Attorney, Agent, or Firm* — FISHERBROYLES, LLP; Roger L. Browdy

(57) ABSTRACT

The invention relates to a thermoplastic polymer composition, in particular to a polyamide composition, having improved flame-retardant properties by maintaining its good physical properties. Furthermore, the invention relates to a method of preparing said thermoplastic polymer composition and to shaped articles, in particular fibers, made of the thermoplastic polymer composition of the invention and that have excellent properties in order to ensure adequate fire protection.

15 Claims, No Drawings

POLYAMIDE COMPOSITION COMPRISING A FLAME RETARDANT POLYESTER AND METHOD FOR PREPARING IT

TECHNICAL FIELD OF THE INVENTION

The invention relates to a thermoplastic polymer composition, in particular to a polyamide composition, having improved flame-retardant properties by maintaining its good physical properties. Furthermore, the invention relates to a method for preparing said thermoplastic polymer composition and to shaped articles, in particular fibers, made of the thermoplastic polymer composition of the invention and that have excellent properties in order to ensure adequate fire protection.

BACKGROUND

Flame-retardant polymer compositions are useful for the production of shaped articles in a large number of application fields because of their excellent property profile. In many applications, it is important that the polymer composition has excellent flame-retardant properties in order to ensure adequate fire protection. In addition, it is, however, also important that the further physical properties, such as e.g. tensile modus, tear strength and breaking elongation, fulfill the prescribed requirements for the respective application cases.

While it is possible to impart fire-retardant properties to a polymer by incorporating certain monomers within the polymer backbone, this approach has the disadvantage that there is no flexibility with regard to the specific polymer composition for final use. Therefore, flame retardants are usually added to polymeric materials to enhance the flame-retardant properties of the polymers. This approach provides high flexibility with regard to the polymeric materials although there are also limitations with respect to the required compatibility of the used flame retardant with the polymeric materials.

The flame retardants are subdivided in non-reactive and reactive flame retardants.

For the production of thermoplastic polymer compositions finished to be flame-retarding, a large number of non-reactive flame-retardants has already been in technical use for a long time. However, these are based in most cases on halogen- or antimony-containing substances which recently have come under public criticism due to their negative eco- and genotoxicologic potential. For this reason, halogen- and antimony-free non-reactive flame retardants are increasingly used, such as, e.g., red phosphor, melamine polyphosphate, melamine cyanurate or aluminum phosphinates, as are described in EP-A 1 070 454.

However, the aforementioned flame retardants are only partly suitable for use in melt spinning processes employed for the production of polyamide or polyester fibers. The halogenated flame retardants can considerably damage the spinning nozzle under the temperature and pressure conditions used during spinning. In contrast thereto, melamine polyphosphate, melamine cyanurate or aluminum phosphinates are only insufficiently soluble in polyamides or polyesters, which results in an inhomogeneous distribution of the flame retardant in the base polymer. This leads to considerable drawbacks in particular in the melt-spinning process, since a clogging of the spinning nozzle is caused.

Another approach is to provide flame-retardant thermoplastic polymer composition including 9,10-dihydro-9-oxa-10-phosphaphenanthrene-10-oxide (DOPO) based phosphorous flame-retardant polymers. The 9,10-dihydro-9-oxa-10-phosphaphenanthrene-10-oxide (DOPO) based phosphorous flame-retardant polymers are characterized in that certain monomers, in particular diacid monomers, are incorporated within the polymer backbone. DOPO based flame-retardant polymers and production methods thereof are for example described in GB 157517, U.S. Pat. No. 8,470,916 or EP 2597179.

According to GB 157517, the flame-retardant polymers as described therein can be used in combination with other thermoplastic resins such as polystyrene, acrylonitrile-styrene copolymers, polycarbonates, polyterephthalate resins, polyphenylene oxides, polymethacrylate resins, polyvinyl chloride and ABS resins.

U.S. Pat. No. 8,470,916 refers to a phosphorous flame-retardant polymer based on DOPO, di- or multivalent carboxylic acid, and a polyhydric alcohol, which is preferably monoethyleneglycol, propylene glycol or 1,3-propandiol. This phosphorous-containing polymer has an average molecular weight of more than 20,000, an average degree of polymerization of at least 55 and a dynamic viscosity between 700 and 1300 Pas.

EP 2597179 describes a melt blending of Ukanol FR80, which is a phosphor containing polyester based on DOPO and monoethyleneglycol, and its use in combination with a polyamide to produce polymer fibers, which are suitable for textiles.

The polymers as described in the prior art show good flame retardant properties. However, by combining these polymers with a thermoplastic polymer, in particular with a polyamide, the melt viscosity and the force of the blend undesirably drops and thus, the reliability of the spinning and/or molding process for producing fibers and fabrics of such blends is worse.

There is therefore still a need for flame-retardant polymers exhibiting a high chemical stability and a good solubility in polyamide compositions, which allows productions of, for example, fibers, shaped articles or films from a composition comprising the flame-retardant polymer and the polyamide at high temperatures, such as by melt spinning or other extrusion processes. Furthermore, it is desirable that the flame-retardant polymer can be distributed homogenously in the polyamide by a simple physical mixing under conditions which are usual in a melt-spinning, extrusion or injection-molding process. The flame-retardant polymer should have low tendency to migrate out of the polyamide and, thus, produce a permanent flame-retarding effect.

Furthermore, there is still a need for flame-retardant polymers which exhibit improved flame-retardant properties compared to known flame retardants. An increased flame-retardant effectivity would allow to either produce an article having improved flame-retardancy using the same amount of flame-retardant polymer or to produce an article having the same flame-retardancy as prior art articles but requiring the incorporation of only less flame-retardant polymer. Reducing the required amount of flame-retardant polymer, minimizes the influence on the physical properties of the base polymer. This ensures reliable processing during extrusion, injection-molding or melt-spinning processes and the following process steps, such as stretching, texturing and dyeing.

SUMMARY

The present inventors now found that one or more of the above objects can be achieved by providing a thermoplastic polymer composition comprising a polyamide and a phosphorous-containing polymer, wherein the phosphorous-containing polymer is obtainable by polycondensation of a) at least one phosphorous-containing monomer selected from adducts of
   a1) 9,10-dihydro-9-oxa-10-phosphaphenanthrene-10-oxide (DOPO) and/or nuclear substituted DOPO derivatives, with
   a2) at least one unsaturated di- or multivalent carboxylic acid or ester or anhydride thereof;
b) at least one divalent alcohol comprising an alkyl, cycloalkyl or alkylaryl backbone with 4 to 16 carbon atoms and with a main carbon chain of at least three carbon atoms between the hydroxyl groups of the divalent alcohol; and
c) optionally other monomers with the exception of unsaturated di- or multivalent carboxylic acids, and wherein the amount of acid end-groups present in the phosphorous-containing polymer is lower than the amount of hydroxyl end-groups present in said polymer.

The phosphorous-containing polymer of the invention differs from halogen-free DOPO-based flame retardants of the prior art in that the second monomer used in the polycondensation reaction is a divalent alcohol comprising an alkyl, cycloalkyl or alkylaryl backbone with 4 to 16 carbon atoms and with a main carbon chain of at least three carbon atoms between the hydroxyl groups of the divalent alcohol, while in the prior art mono- or multivalent alcohols are used, in particular ethylene glycol, containing in the main carbon chain only two carbon atoms. Furthermore, the amount of acid end groups present in the obtained phosphorous-containing polymer is lower than the amount of hydroxyl end-groups present in said polymer.

The inventors surprisingly found that the incorporation of this specific divalent alcohol in the phosphorous-containing polymer increases the flame-retardant properties of the polymer without affecting the melt viscosity and thus the compatibility of the phosphorous-containing polymer with the polyamide of the thermoplastic polymer composition. This allows further reducing the amount of the flame-retardant polymer in a thermoplastic polymer composition without deteriorating the flame-retardant properties of the final product.

Another aspect of the present invention relates to a method for preparing the thermoplastic polymer composition as described above.

Another aspect of the present invention relates to shaped articles, in particular fibers, made of the thermoplastic polymer composition of the invention, which show excellent flame-retardant properties and additionally a good dyeing ability.

DETAILED DESCRIPTION

Definitions

In the present description, wherein an element or composition is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components.

Further, it should be understood that elements and/or features of an apparatus, a process or method described herein can be combined in a variety of ways without departing from the scope and disclosures of the present teachings, whether explicit or implicit herein.

The term "thermoplastic polymer" shall mean a polymer that becomes pliable or moldable above a specific temperature, so is capable of flow at high temperatures below the thermal decomposition temperature and returns to a solid state upon cooling. A polymer is a macromolecular compound prepared by reacting (i.e., polymerizing, condensation) monomers of the same or different type, including homo- and copolymers. Thermoplastic materials are made by chain polymerization, polyaddition and/or polycondensation.

The term "comprising" includes "consisting essentially of" and "consisting of".

In the present specification, the description of a range of values for a variable, defined by a bottom limit, or a top limit, or by a bottom limit and a top limit, also comprises the embodiments in which the variable is chosen, respectively, within the value range: excluding the bottom limit, or excluding the top limit, or excluding the bottom limit and the top limit.

In the present specification, the description of several successive ranges of values for the same variable also comprises the description of embodiments where the variable is chosen in any other intermediate range included in the successive ranges. Thus, for example, when it is indicated that "the magnitude X is generally at least 10, advantageously at least 15", the present description also describes the embodiment where: "the magnitude X is at least 11", or also the embodiment where: "the magnitude X is at least 13.74", etc.; 11 or 13.74 being values included between 10 and 15.

In the present specification, the choice of an element from a group of elements also explicitly describes:

- the choice of two or the choice of several elements from the group,
- the choice of an element from a subgroup of elements consisting of the group of elements from which one or more elements have been removed.

A plurality of elements includes two or more elements.

The phrase 'A and/or B' refers to the following selections: element A; or element B; or combination of elements A and B (A+B). The phrase 'A and/or B' is equivalent to at least one of A and B. The phrase 'A and/or B' equates to at least one of A and B.

The phrase 'A1, A2, . . . and/or An' with n≥3 includes the following choices: any single element Ai (i=1, 2, . . . n); or any sub-combinations of from two to (n−1) elements chosen from A1, A2, . . . , An; or combination of all elements Ai (i=1, 2, . . . n). For example, the phrase 'A1, A2, and/or A3' refers to the following choices: A1; A2; A3; A 1+A2; A 1+A3; A2+A3; or A 1+A2+A3.

The use of the singular 'a' or 'one' herein includes the plural unless specifically stated otherwise. By way of example, "a divalent alcohol" denotes one divalent alcohol or more than one divalent alcohol.

In addition, if the term "about" or "ca." is used before a quantitative value, the present teachings also include the specific quantitative value itself, unless specifically stated otherwise. As used herein, the term "about" or "ca." refers to a ±10% variation from the nominal value unless specifically stated otherwise.

As mentioned above, one aspect of the invention relates to a thermoplastic polymer composition comprising a polyamide, as thermoplastic polymer, and a phosphorous-containing polymer, wherein the phosphorous-containing polymer is obtainable by polycondensation of a) at least one phosphorous-containing monomer selected from adducts of
   a1) 9,10-dihydro-9-oxa-10-phosphaphenanthrene-10-oxide (DOPO) and/or nuclear substituted DOPO derivatives, with
   a2) at least one unsaturated di- or multivalent carboxylic acid or ester or anhydride thereof;
b) at least one divalent alcohol comprising an alkyl, cycloalkyl or alkylaryl backbone with 4 to 16 carbon atoms and with a main carbon chain of at least three carbon atoms between the hydroxyl groups of the divalent alcohol; and
c) optionally other monomers with the exception of unsaturated di- or multivalent carboxylic acids, and wherein the amount of acid end-groups present in the phosphorous-containing polymer is lower than the amount of hydroxyl end-groups present in said polymer.

In other words, the invention relates to a thermoplastic polyamide composition comprising a specific phosphorous-containing polymer in order to improve the flame retardant properties of the composition without affecting the physical properties of the composition.

In a preferred embodiment, the polyamide (PA) of the thermoplastic polymer is a PA that is suitable for melt spinning or other molding processes. In a more preferred embodiment, the polyamide is selected from the group consisting of aliphatic, cycloaliphatic or semiaromatic polyamide and mixture thereof.

In an even more preferred embodiment of the invention, the polyamide is selected from the group consisting of PA 6, PA 10, PA 11, PA 12, PA 6.6, PA 6.9, PA 4.6, PA 4.10, PA 5.10, PA 6.10, PA 6.12, PA 6.14, PA 10.10, PA 10.12, PA 10.14, PA 10.18, PA 12.12, PA 6.18, PA 6.36, PA 9.T, PA 6.T, PA 6.1, PA 10.T, PA PACM.6 (PACM=4,4-Diaminodi-cyclohexylmethane), PA MPMD.10 (MPMD=methylpentamethylenediamine), MPMD.6/MPMD.T, PA IPD.6 (IPD=isophoronediamine), blends thereof and copolymers based on these polyamides.

Most preferably the polyamide is selected from the group consisting of PA 6.6, PA 6, PA 6.10, PA 6.12, PA 11 and PA 12 and copolyamides PA 6.6/6, PA 6/6.6, PA 6/6.T, PA 6.T/6, PA 6.10/6.T, PA 6.6/6.T, PA 6.T/6.6, PA 6.T/6.I, PA 6.T/6.I/6.6, PA 6.T/MPMD.T and blends thereof, such as PA 6.6/PA 6, PA 6.10/PA 6.6 and PA 6.6/6.T/PA 6, PA 6.6, PA 6, PA 6.10, PA 6.12, PA 11 and PA 12, copolyamides, such as PA 66/6 and blends of polyamides, such as PA 66/PA 6 are suitable as well.

It is also preferred that in addition to the polyamide as defined above other thermoplastic polymers are used in the thermoplastic polymer composition of the invention. These thermoplastic polymers can be selected from a broad variety of polymers, in particular synthetic polymers, including homopolymers, copolymers and block copolymers. Also mixtures of one or more thermoplastic polymers may be used. A list of suitable synthetic polymers is, for example, disclosed in WO 2008/119693 A1, the content of which is incorporated herein by reference. Specific examples of suitable thermoplastic polymers are, for example, polyphthalamides, polyesters including unsaturated polyester resins, polysulfones, polyimides, polyolefins, polyacrylates, polyether etherketones, acrylonitrile butadiene styrenes (ABS), polyurethanes, polystyrenes, polycarbonates, polyphenylene oxides, phenolic resins and mixtures thereof.

Nevertheless, the polyamide as described above is the base polymer of the thermoplastic polymer composition.

Therefore, it is preferred that the thermoplastic polymer composition of the invention comprises the above-described polyamide in an amount of at least 70% by weight, more preferred of at least 80% by weight, even more preferred of at least 90% by weight, most preferred of at least 94% by weight, based on the total weight of the thermoplastic polymer composition.

According to the invention, the thermoplastic polymer composition may comprise the polyamide in an amount of from 70 to 99% by weight, preferably of from 75 to 98% by weight, more preferably from 85 to 95% by weight, based on the total weight of the thermoplastic polymer composition.

In addition to the polyamide, the thermoplastic polymer composition of the invention comprises a phosphorous-containing polymer obtainable by polycondensation of a) at least one phosphorous-containing monomer selected from adducts of
   a1) 9,10-dihydro-9-oxa-10-phosphaphenanthrene-10-oxide (DOPO) and/or nuclear substituted DOPO derivatives, with
   a2) at least one unsaturated di- or multivalent carboxylic acid or ester or anhydride thereof;
b) at least one divalent alcohol comprising an alkyl, cycloalkyl or alkylaryl backbone with 4 to 16 carbon atoms and with a main carbon chain of at least three carbon atoms between the hydroxyl groups of the divalent alcohol; and
c) optionally other monomers with the exception of unsaturated di- or multivalent carboxylic acids, and wherein the amount of acid end-groups present in the polymer is lower than the amount of hydroxyl end-groups present in the polymer.

In a preferred embodiment, the phosphorous-containing polymer is halogen-free.

In the polycondensation reaction, which makes the phosphorous-containing polymer of the present invention obtainable, a phosphorous-containing monomer a) is used. This monomer is an adduct of 9,10-dihydro-9-oxa phosphaphenanthrene-10-oxide (DOPO) and/or nuclear substituted DOPO derivatives with at least one unsaturated di- or multivalent carboxylic acid or ester or anhydride thereof. DOPO has the following chemical structure:

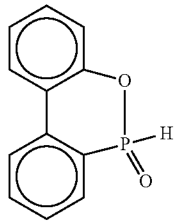

"Nuclear substituted DOPO derivatives" denotes DOPO derivatives which bear one or more substituents on the aromatic rings of DOPO. Each ring may bear 0 to 4 substituents, which can for example be selected from alkyl, alkoxy, aryl, aryloxy and aralkyl. The alkyl moiety in alkyl, alkoxy and aralkyl may have, for example, 1 to 30 carbon atoms, which may be linear, branched or cyclic and which may be saturated or unsaturated, preferably saturated. The aryl in aryl, aryloxy and aralkyl may, for example, comprise 6 to 30 carbon atoms, such as phenyl and naphthyl. If the DOPO molecule bears more than one nuclear substituent, these substituents may be identical or different to each other.

To obtain the phosphorous-containing monomer a), the DOPO and/or nuclear substituted DOPO derivatives are reacted with at least one unsaturated di- or multivalent carboxylic acid or ester or anhydride thereof to form an adduct. This adduct formation is shown in the following reaction scheme by way of example using DOPO and itaconic acid as unsaturated dicarboxylic acid. It is, however, to be understood that instead of DOPO, nuclear substituted DOPO derivatives and instead of itaconic acid, other di- or multivalent unsaturated carboxylic acids or esters or anhydrides thereof may be used.

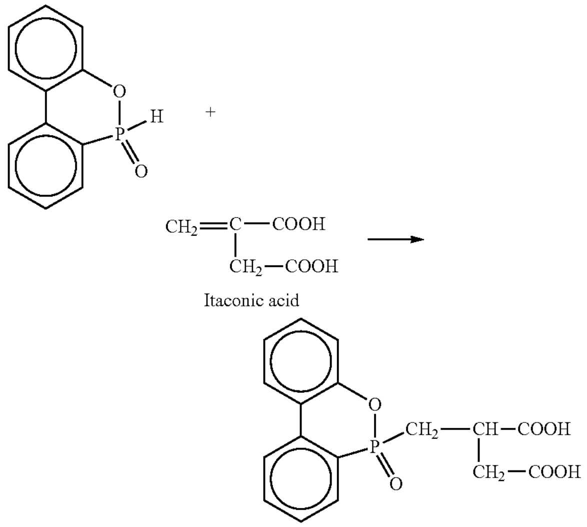

In one embodiment of the present invention, the unsaturated di- or multivalent carboxylic acid or ester or anhydride thereof is a divalent carboxylic acid or ester or anhydride thereof. In a preferred embodiment, the divalent carboxylic acid or ester or anhydride thereof is selected from the group consisting of itaconic acid, maleic acid, fumaric acid, endomethylene tetrathydrophthalic acid, citraconic acid, mesaconic acid, and tetrahydrophthalic acid and esters and anhydrides thereof. Itaconic acid and maleic acid and anhydrides thereof being particularly preferred.

In one embodiment of the present invention, the phosphorous-containing monomer a) can be selected from a compound represented by the following general formula (I):

(I)

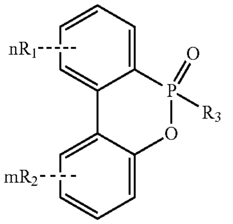

wherein n and m are integers from 0 to 4;

$R_1$ and $R_2$ are independently selected from alkyl, alkoxy, aryl, aryloxy and aralkyl, wherein, if more than one of $R_1$ and/or $R_2$ are present, each of these substitutents can be identical or different to each other; and $R_3$ denotes a residue derived from the unsaturated di- or multivalent carboxylic acid or ester or anhydride thereof.

$R_1$ and $R_2$ are preferably defined as above with respect to the definition of the nuclear substituted DOPO derivatives. In a preferred embodiment, $R_1$ and $R_2$ are independently selected from $C_{1-8}$ alkyl and $C_{1-8}$ alkoxy; and n and m are independently 0 or 1.

In order to facilitate a high thermal stability of the final phosphorous-containing polymer, it is preferred that the phosphorous-containing monomer a) does not contain any carbon-carbon double or triple bonds except aromatic bonds.

Using the above-described phosphorous-containing monomer a), the phosphorous-containing polymer used in the invention can be obtained by polycondensation with at least one specific divalent alcohol, i.e. with at least one ester-forming monomer b) as defined below. This polycondensation reaction results in a polyester.

According to the invention, the specific divalent alcohol comprises an alkyl, cycloalkyl or alkylaryl backbone with 4 to 16 carbon atoms, preferably with 5 to 12 carbon atoms, more preferably with 6 to 10 carbon atoms.

Additionally, according to the invention, the number of carbon atoms, which separates the hydroxyl groups of the divalent alcohol, is at least three carbon atoms. In one embodiment of the invention it is preferred that this number is between 3 and 16 carbon atoms, more preferably between 4 and 12, even more preferably between 6 and 10.

Advantageously, the divalent alcohol of the invention doesn't contain phosphorous.

In a preferred embodiment, the divalent alcohol of the invention is selected from the group consisting of 1,4-butanediol, 1,3-butanediol, 1,5-pentanediol, neopentylglycol, 1,5-hexanediol, 1,6-hexanediol, 1,7-heptanediol, 2,2-diethyl-1,3-propanediol, 2-methyl-2-propyl-1,3-propanediol, 1,8-octanediol, 2,2,4-trimethyl-1,3-pentanediol, 2-ethyl-1,3-hexanediol, 1,9-nonanediol, 2-butyl-2-ethyl-1,3-propanediol, 1,10-decanediol, 2,2-dibutyl-1,3-propanediol, 1,12-dodecanediol, 1,14-tetradecanediol, 1,16-hexadecanediol, 1,4-cyclohexanediol, 1,3-cyclohexanediol, 1,4-cyclohexanedimethanol, 2,2,4,4-tetramethyl-1,3-cyclobutanediol, 2-phenyl-1,3-propanediol, 2-phenyl-1,2-propanediol, 1,2-benzenedimethanol, 1,3-benzenedimethanol, 1,4-benzenedimethanol and mixtures thereof.

In a further preferred embodiment, the ester-forming monomer b) of the invention is 1,4-butanediol, 1,3-butanediol, 1,5-pentanediol, neopentylglycol, 1,5-hexanediol, 1,6-hexanediol, 1,7-heptanediol, 2,2-diethyl-1,3-propanediol, 2-methyl-2-propyl-1,3-propanediol, 1,8-octanediol, 2,2,4-trimethyl-1,3-pentanediol, 2-ethyl-1,3-hexanediol, 1,9-nonanediol, 2-butyl-2-ethyl-1,3-propanediol, 1,10-decanediol, 1,4-cyclohexanediol, 1,3-cyclohexanediol, 1,4-cyclohexanedimethanol, 2,2,4,4-tetramethyl-1,3-cyclobutanediol, 2-phenyl-1,3-propanediol, 1,2-benzenedimethanol, 1,3-benzenedimethanol, 1,4-benzenedimethanol or mixtures thereof.

It is also preferred that the ester-forming monomer b) of the invention is 1,4-butanediol, 1,3-butanediol, 1,5-pentanediol, neopentylglycol, 1,5-hexanediol, 1,6-hexanediol, 1,7-heptanediol, 2,2-diethyl-1,3-propanediol, 2-methyl-2-propyl-1,3-propanediol, 1,8-octanediol, 2,2,4-trimethyl-1,3-pentanediol, 2-Ethyl-1,3-hexanediol, 1,4-cyclohexanediol, 1,3-cyclohexanediol, 1,4-cyclohexanedimethanol, 2,2,4,4-tetramethyl-1,3-cyclobutanediol, 1,2-benzenedimethanol, 1,3-benzenedimethanol, 1,4-benzenedimethanol or mixtures thereof.

In a more preferred embodiment, the ester-forming monomer b) of the invention is 1,4-butanediol, 1,3-butanediol, 1,5-pentanediol, neopentylglycol, 1,6-hexanediol, 2,2,4-trimethyl-1,3-pentanediol, 2-ethyl-1,3-hexanediol, 1,4-cyclohexanedimethanol.

In an even more preferred embodiment, the ester-forming monomer b) of the invention is 1,4-butanediol, neopentylglycol, 1,6-hexanediol, 1,4-Cyclohexanedimethanol, 1,10-decanediol or mixtures thereof.

In a most preferred embodiment, the ester-forming monomer b) is neopentylglycol or 1,6-hexanediol.

The use of neopentylglycol or 1,6-hexanediol as monomer b) results into polymers comprising repeating units, which are represented by the following chemical structures (II or III):

(II)

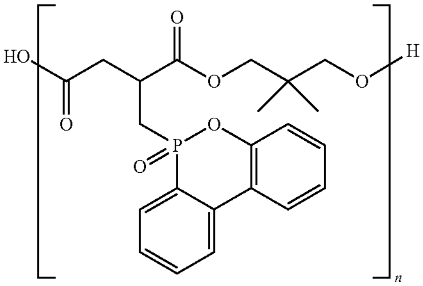

(III)

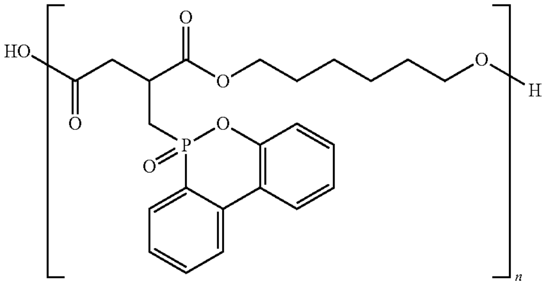

It is preferred that the mole fraction of repeating units (n) of the phosphorus-containing polymer according to the invention, which is a polyester, is at least 5, more preferred at least 7, even more preferred at least 8. In one embodiment of the invention the mole fraction of repeating units of the phosphorous-containing polymer is between 5 and 15, preferably between 6 and 10.

The above-described phosphorous-containing polymer may optionally comprise other monomer residues in addition to the phosphorous-containing monomer a) and the divalent alcohol (monomer b)). These other monomers are not particularly limited as long as they can react with the first monomer a) and the second monomer b) to form a polymer. However, the other monomer is not an unsaturated di- or multivalent carboxylic acid. Preferably, the other monomer does not contain any carbon-carbon double or triple bond except aromatic bonds in order to obtain a final flame-retardant polymer of high thermal stability.

The "other monomers" c) can be selected or example from di- and multivalent carboxylic acids and di- or multivalent alcohols, which may or may not comprise phosphorous atoms or other heteroatoms, such as oxygen, nitrogen and sulfur. Other monomers, which can for example form block copolymers with the polyester units of monomers a) and b), may be used.

As a high phosphorous content of the flame-retardant polymer of the invention is desired, the amount of "other monomers" in the polymer should be low, in particular if the other monomers do not contain any phosphorous atoms. It can therefore be of advantage if, for example, less than 20%, preferably less than 10% and even more preferably less than 5% of the monomer residues of the polymer are residues of "other monomers" c). In a preferred embodiment, the flame-retardant polymer of the invention does not contain any "other monomers" c).

If present, "other monomers" c) can, for example, be selected from carboxyphosphinic acid derivatives, such as carboxyethyl-phenylphosphinic acid (CEPPA) and carboxyethyl-methylphosphinic acid (CEMPA), aminophosphinic acid derivatives making an amide bond by polycondensation, such as aminomethyl phosphinic acid (AMPA), biscarboxyphosphine oxide derivatives, such as bis(beta-carboxyethyl)methylphopsphine oxide (CEMPO), bisaminophosphine oxide derivatives making an amide bond by polycondensation, such as bis(3-aminopropyl)methylphosphine oxide (AMPO), aliphatic diols, such as monoethylene glycol, diethylene glycol, propylene glycol, 1,3-propanediol, 1,3-butandiol, 1,4-butandiol, neopenthyl glycol, hexandiol and 1,10-decandiol, and polyvalent alcohols, such as tri-2-hydroxyethyl isocyanurate (THEIC), glycerol, trimethylolethane, trimethylylpropane, pentaerythrite and sugar alcohols, such as mannitol, multivalent carboxylic acids, such as terephthalic acid, isophthalic acid, phthalic acid, sebacic acid, adipic acid, glutaric acid and succinic acid, as well as hydroxycarboxylic acids, such as lactic acid, glycolic acid, caprolactone and malic acid.

The chemical and physical properties of the phosphorous-containing polymer as described above can be influenced by selecting di- or multivalent monomers. If only divalent monomers are employed, no branching of the polymer backbones occurs. If multivalent monomers are used, branching will occur. By selecting a suitable ratio between di- and multivalent monomers, the degree of branching and thus the properties of the polymer can be tailored.

According to the invention, the amount of acid end-groups of the phosphorous-containing polymer is lower than the amount of hydroxyl end-groups present in said polymer. Preferably, the amount of acid end-groups present in the phosphorous-containing polymer is equal to or less than 10 mg KOH/g, more preferably equal to or less than 6 mg KOH/g, even more preferably equal to or less than 2 mg KOH/g, most preferably equal to or less than 1 mg KOH/g, determined by titration in pyridine with NaOH. In a further embodiment of the invention it is preferred that the amount of acid end-groups present in the polymer is 0.1 mg KOH/g or higher, more preferably 0.2 mg KOH/g or higher, even more preferred 0.3 mg KOH/g or higher, most preferred 0.8 mg KOH/g or higher, determined by titration in pyridine with NaOH.

The amount of hydroxyl end-groups present in the phosphorous-containing polymer of the invention is preferably between 5 and 50 mg KOH/g, more preferably between 10 mg and 40 mg KOH/g even more preferred between 15 and 35 mg KOH/g, determined by titration in pyridine with NaOH.

The way to control the amounts of the end-groups can be done by any method known in the art, for instance through the molar ratio of monomer a) and b) used in the polycondensation reaction for producing the phosphorous-containing polymer and/or by the amount of monovalent monomer c) used in the reaction.

To improve the compatibility with the polyamide of the thermoplastic polymer composition, the phosphorous-containing polymer may be end-capped by reaction with a monovalent alcohol and/or a monovalent carboxylic acid.

It is preferred that the phosphorous-containing polymer of the invention has a high phosphorous content of above 5.0% by weight. Throughout this description, the phosphorous content is given in % by weight based on the total weight of the polymer. In more preferred embodiments, the polymer has a phosphorous content of at least 6.0% by weight, more preferably at least 6.5% by weight, even more preferably at least 7% by weight. The upper limit of the phosphorous content in the polymer of the invention is not particularly limited and depends on the monomers used. Generally, the phosphorous content should not be above 18% by weight, preferably at a maximum of 14% by weight, more preferably at a maximum of 13% by weight and even more preferably at a maximum of 12% by weight. The given lower and upper limits of the phosphorous content can be combined with each other. Suitable ranges are, for example, above 5.0% to about 18% by weight and about 6.0% to about 12% by weight. Other combinations of lower and upper limits are possible as well. In preferred embodiments, the phosphorous content is about 6.5% to about 18% by weight, more preferably about 7.0% to about 14% by weight, each of the total weight of the polymer.

The average molecular weight Mn of the phosphorous-containing polymer according to the invention may be above 1,000 g/mol, such as above 3,000 g/mol or even above 5,000 g/mol or above 10,000 g/mol. It is even more preferred that the average molecular weight Mn of the phosphorous-containing polymer according to the invention is between 1000 and 20,000 g/mol.

In one embodiment, the phosphorous-containing polymer according to the invention preferably has a dynamic viscosity of at least 20 Pa·s, preferably of at least 100 Pa·s, even more preferably of at least 200 Pa·s, at a temperature of 120° C. In this viscosity range, an optimum processability of the polyester in the melt-spinning process and other extrusion processes is obtained. The desired viscosity can be adjusted by an accurate monitoring of the average molecular weight Mn, the average degree of polymerization Pn and/or the degree of branching of the polyester.

The chemical and physical properties of the phosphorous-containing polymer according to the invention can further be influenced by the temperature and time of polycondensation, the catalyst used and the addition of, for example, chain prolongation and chain branching monomers. Heat stabilizers may also be added. To improve the color of the phosphorous-containing polymer according to the invention, it is further possible to use known optical brightening agents.

By using the phosphorous-containing polymer as described above in the thermoplastic polymer composition of the invention all aforementioned polyamides can be finished in an excellent manner to be flame-retarding without influencing the important polyamide properties, such as the melt viscosity, the melting point of the thermoplastic polymer composition obtained after mixing the polyamide with the phosphorous-containing polymer are changed only to an extent that a reliable processing, such as a melt spinning remains entirely ensured.

The amount of phosphorous-containing polymer present in the thermoplastic polymer composition of the invention is not particularly limited and can be selected by a person skilled in the art according to the requirements. In one embodiment of the invention, the thermoplastic polymer composition of the invention may comprise at least 1% by weight, preferably at least 4% by weight, more preferably at least 6% by weight, of the phosphorous-containing polymer, based on the total weight of the thermoplastic polymer composition. In another embodiment, the thermoplastic polymer composition may comprise from about 1% to about 30% by weight, preferably from about 3% to about 20% by weight, more preferably from about 5% to 15% by weight, of the phosphorous-containing polymer, based on the total weight of the thermoplastic polymer composition.

In a further embodiment, the thermoplastic polymer composition may comprise the phosphorous-containing polymer in an amount such that the final thermoplastic polymer composition has a phosphorous content of from about 0.1% to about 2% by weight, in particular of from about 0.5 to about 1% by weight, based on the total weight of the thermoplastic polymer composition.

It is also possible to first prepare a master batch of a thermoplastic polymer composition containing a higher phosphorous content of up to, for example, about 8% by weight of the total weight of the composition and then add this master batch to another thermoplastic polymer composition for tailoring its properties. For example, to produce flame-retardant polymer fibers, the phosphorous containing polymer according to the invention can physically be mixed with an appropriate polyamide in the melt, and the mixture is then either directly spun as a polymer mixture having a phosphorous content of between about 0.1% and about 2% by weight, so as to form filaments, or, the mixture is then tailored in terms of a master batch having a phosphorous content of between about 2% and about 8% by weight, and is then added to the same or a different type of polyamide and spun to filaments in a second process step.

Furthermore, according to the invention, it is preferred that the thermoplastic polymer composition of the invention has an amino-end-group (AEG) concentration which is closed to the AEG concentration of the polyamide present in the thermoplastic polymer composition. This results into a good dyeing ability of the shaped article, for examples fibers, which are made of the thermoplastic polymer composition according to the invention, in particular if non-metallised acid dyes are used for dyeing the fibers (see scientific publication of S. M. Burkingshaw, "Chemical Principles of Synthetic Fiber Dyeing", Springer Science & Business Media, Jun. 30, 1995).

Therefore, it is preferred that the thermoplastic polymer composition according to invention has an amino-end-group concentration of at least 10 meq/kg, more preferred of at least 15 meq/kg, even more preferred of at least 20 meq/kg, most preferably at least 25 meq/kg, determined by potentiometric titration. In a further embodiment of the invention it is preferred that the thermoplastic polymer composition according to invention has an amino-end-group concentration of between 15 and 100 meq/kg, more preferred of between 17 and 50 meq/kg, even more preferred of between 35 and 60 meq/kg, determined by potentiometric titration.

The thermoplastic polymer composition of the present invention may additionally comprise other flame retardants or additives known to a person skilled in the art, in particular those flame retardants and additives which are used in the preparation of fibers. Suitable other flame-retardants are, for example, melamine cyanurate, melamine polyphosphate, ammonium polyphosphate and metal stannates, preferably zinc stannate, metal borates such as zinc borate, polyhedral oligomeric silsesquioxanes (for example trade name POSS of Hybrid Plastics), and so-called nanoclays based on the exfoliated phyllosilicates montmorillonite and bentonite, such as, e.g., the products Nanomer of Nanocor, or Nanofil of Südchemie, and inorganic metal hydroxides such as the products Magnifin or Martinal of Martinswerk. Due to the use of these additives, parameters that are important to the flame-retarding properties can be modified, for example the characteristic cone calorimetric numbers TTI (time to ignition) can be increased, PHRR (peak of heat release rate) can be reduced and/or a desired suppression of the smoke gas generation can be improved.

Both, the phosphorous-containing polymer as well as the thermoplastic polymer composition according to the invention may comprise additional components, such as anti-dripping agents, polymer stabilizers, anti-oxidants, light stabilizers, peroxide scavengers, nucleating agents, fillers and reinforcing agents, and other additives, such as blend compatibilizing agents, plasticizers, lubricants, emulsifiers, pigments, rheology additives, catalysts, flow-control agents, optical brighteners, flame-proving agents, antistatic agents and blowing agents. Specific examples of these additives are disclosed in WO 2008/119693 A1, the content of which is incorporated herein by reference.

In one embodiment of the invention, the thermoplastic polymer composition consists of the polyamide and the phosphorous-containing polymer as defined above.

A further embodiment of the present invention relates to a method for producing the thermoplastic polymer composition of the invention, wherein in a first step the phosphorous-containing polymer of the invention is obtained by reacting the monomers a) with monomer b) and optionally c) as defined such that the amount of acid end-groups present in the phosphorous-containing polymer is lower than hydroxyl end-groups of said polymer, and afterwards the obtained phosphorous-containing polymer is physically mixed (blended) with the polyamide.

According to the invention, it is preferred that the phosphorous-containing polymer is obtained by a polycondensation reaction of phosphorous-containing monomer a) and divalent alcohol b) and optionally monomer c). The polycondensation reaction comprises the following steps:

a) reacting 9,10-dihydro-9-oxa-10-phosphaphenanthrene-10-oxide (DOPO) and/or nuclear substituted derivatives thereof with at least one unsaturated di- or multivalent carboxylic acid or ester or anhydride thereof to obtain a phosphorous-containing monomer;
b) reacting monomer obtained in step a) with at least one divalent alcohol as defined above, and optionally other monomers with the exception of unsaturated di- or multivalent carboxylic acids; and
c) optionally reacting the polymer obtained in step b) with at least one monovalent carboxylic acid and/or monovalent alcohol to obtain an end-capped polymer.

In another embodiment, the phosphorous-containing polymer may be prepared by effecting alcoholysis between the divalent alcohol b) as defined above and phosphorous-containing monomer a) that has previously been esterified with a volatile lower alcohol, for example ethanol, methanol, propanol, butanol etc.

According to the invention, the phosphorous-containing polymer of the invention may also be prepared by effecting the polycondensation reaction simultaneously with the monomers a1) and a2), b) and c) as defined above, wherein the formation of monomer a) is carried out in situ through the reaction of monomers a1) and a2).

Suitable reaction conditions and in particular polycondensation conditions are known to the person skilled in the art. Useful specific parameters are exemplified in the examples below.

A further aspect of the invention relates to shaped articles comprising or consisting of the thermoplastic polymer composition of the invention.

In particular, the invention refers to polymer fibers obtainable by melt-spinning of the thermoplastic polymer composition according to the invention.

Since the thermoplastic polymer composition shows in addition to the improved flame retardant properties also excellent physical properties it is possible to melt-spin the composition under conditions as usually used in the art.

Furthermore, the such produced fibers shows good dyeing properties, in particular with respect to non-metallised acid dyes. Nevertheless, every dye, which is usually used in the art for dyeing fibers and/or yarns, can be used for dyeing the shaped articles, in particular the fibers, according to the invention;

Preferably, the dye is selected from the group consisting of metallised dyes, non-metallised dyes, dispersed dyes, monosulfonated dyes, disulfonated dyes and mixtures thereof as known in the art. More preferably, according to the invention, the dye is a non-metallised acid, for example Dyestar, Archroma and CHT Furthermore, every method as known in the art can be used for dyeing the shaped articles/fibers of the invention.

Furthermore, the fibers of the invention preferably have a total phosphorous content of from about 0.1% to about 2% by weight, in particular of from about 0.5 to about 1% by weight, based on the total weight of the thermoplastic polymer composition, and they are therefore sufficiently flame-proof.

The invention will now be further described by the following examples, which are, however, not to be understood in a limiting sense.

EXAMPLES

The present invention is further illustrated by the following examples. It should be understood that the following examples are for illustration purposes only, and are not used to limit the present invention thereto.

Analyses Methods:

Glass transition temperatures determined by DSC, at 10° C./min.

Onset of thermal degradation temperature determined by TGA, at 10° C./min under nitrogen flow.

The acid and hydroxyl numbers were respectively determined by titration in pyridine with NaOH, directly or after reaction with phthalic anhydride.

Phosphorus content by ICP/OES after sulfonitric mineralization.

Amine End-Groups (AEG) concentration were determined by potentiometric titration (unit: meq/kg).

Viscosity Number (VN) (unit: mL/g) was determined in solution in formic acid according to ISO307 standard.

Raw Materials:

Ethylene glycol, 1,2-Propanediol, 1,3-Propanediol, 1,4-Butanediol, 1,2-Butanediol, Neopentylglycol, 1,6-Hexanediol, 1,10-Decanediol, 1,4-Cyclohexanedimethanol purchased by Sigma Aldrich.

(6-oxide-6H-dibenzo (c,e) (1,2) oxa-phosphotdn-6-yl) butanedioic acid, Lunastab DDP, CAS [63562-33-4].

3-9,10-Dihydro-9-oxa-10-phosphaphenanthrene 10-oxide, DOPO, CAS [35948-25-5], from TCI.

Itaconic acid, CAS [97-65-4], purchased by Sigma Aldrich.

Nexamite A99, CAS [34052-90-9], by Nexam Chemical.

Stabamid 26AE1, which is a PA66 from Solvay, having VN=130 mL/g.

Ukanol FR80, from Schill Seilacher, containing 8.0% w of phosphorus according to technical data sheet. Ukanol FR 80 is used in US 2013/0136911 A1 as flame retardant. It has the following chemical structure:

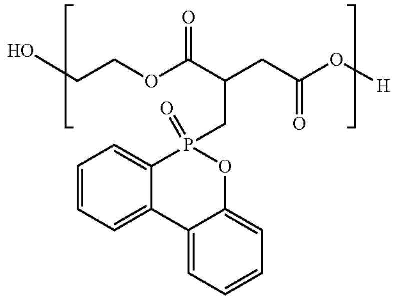

Synthesis of Phosphorous Containing Polymer at Lab-Scale

Example 1 (Production of a Phosphorous Containing Polyester According to the Invention)

103.9 g (0.300 mol) of Lunastab DDP and 44.3 g (0.375 mol) of 1,6-Hexanediol were poured in a one-liter flask equipped with a mechanical stirrer with vacuum/nitrogen inlet and a distillation column followed by a condenser and an internal thermometer. The temperature was increased progressively to 160° C. under nitrogen, with continuous stirring, and kept for 1 h at this temperature. The temperature was then slowly increased up to 240° C. and kept at this temperature for 3 h and the reaction water thereby produced was continuously removed by distillation. Then the heater was stopped and the adduct was let to cool down to room temperature. The day after the temperature was progressively increased to 160° C. under nitrogen and 0.015 g of tetra-n-butyl titanate in solution in 0.29 g of monoethylene glycol was introduced in the adduct. Then the temperature was increased progressively to 240° C. The column was then removed, and the pressure was reduced below 50 mbar for 4 h, under continuous stirring. After cooling, a glassy polymer was obtained which contained polyester chains represented by the following formula:

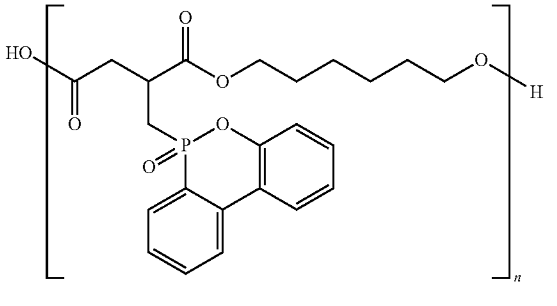

wherein n denotes the mole fraction of the polyester repeating unit. The polymer thus obtained had the following analytical data:

The amorphous polyester had a glass transition temperature of 42° C., and a thermal degradation onset of 390° C.

The acid and hydroxyl numbers were respectively 0.3 mgKOH/g and 32 mgKOH/g, corresponding to about n=8.

The phosphorous content was 7.0% w.

Example 2 (Production of a Phosphorous Containing Polyester According to the Invention)

Similarly to Example 1, 103.9 g (0.300 mol) of Lunastab DDP and 39.1 g (0.375 mol) of Neopentylglycol were polycondensated. After cooling, a glassy polymer was obtained which contained polyester chains represented by the following formula:

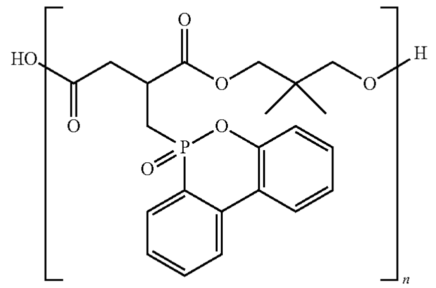

wherein n denotes the mole fraction of the polyester repeating unit. The polymer thus obtained had the following analytical data:

The amorphous polyester had a glass transition temperature of 84° C., and a thermal degradation onset of 409° C.

The acid and hydroxyl numbers were respectively 0.8 mgKOH/g and 27 mgKOH/g, corresponding to about n=10.

The phosphorous content was 7.3% w.

Example 3 (Production of a Phosphorous Containing Polyester According to the Invention)

Similarly to Example 1, 103.9 g (0.300 mol) of Lunastab DDP and 51.9 g (0.360 mol) of 1,4-Cyclohexanedimethanol were polycondensated. After cooling, a glassy polymer was obtained. The polymer thus obtained had the following analytical data:

The amorphous polyester had a glass transition temperature of 81° C., and a thermal degradation onset of 410° C.

The acid and hydroxyl numbers were respectively 0.5 mgKOH/g and 39 mgKOH/g, corresponding to about n=6.

The phosphorous content was 6.7% w.

Example 31 (Production of a Phosphorous Containing Polyester According to the Invention)

64.9 g (0.300 mol) of DOPO, 39.1 g (0.375 mol) of neopentyl glycol and 13.0 g (0.100 mol) of itaconic acid were poured in a one-liter flask equipped with a mechanical stirrer with vacuum/nitrogen inlet and a distillation column followed by a condenser and an internal thermometer. The temperature was increased progressively to 120° C. under nitrogen, with continuous stirring. Then 26.0 g (0.200 mol) of itaconic acid were added in two steps. Temperature was increased to 160° C. and kept for 30 min at this temperature. The temperature was then slowly increased up to 190° C. and kept at this temperature for 3 h and the reaction water thereby produced was continuously removed by distillation. Then the heater was stopped and the adduct was let to cool down to room temperature. The day after the temperature was progressively increased to 160° C. under nitrogen and 0.015 g of tetra-n-butyl titanate in solution in 0.29 g of monoethylene glycol was introduced in the adduct. Then the temperature was increased progressively to 190° C. The column was then removed, and the pressure was reduced below 50 mbar for 4 h, under continuous stirring.

After cooling, a glassy polymer was obtained which contained polyester chains represented by the following formula:

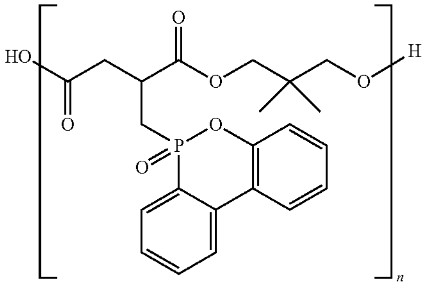

wherein n denotes the mole fraction of the polyester repeating unit. The polymer thus obtained had the following analytical data:

The amorphous polyester had a glass transition temperature of 84° C., and a thermal degradation onset of 410° C.

The acid and hydroxyl numbers were respectively 10.1 mgKOH/g and 40.6 mgKOH/g, corresponding to about n=5.

The phosphorous content was 7.4% w.

Example 32 (Production of a Phosphorous Containing Polyester According to the Invention)

103.9 g (0.300 mol) of Lunastab DDP and 39.1 g (0.375 mol) of Neopentylglycol were poured in a one-liter flask equipped with a mechanical stirrer with vacuum/nitrogen inlet and a distillation column followed by a condenser and an internal thermometer. The temperature was increased progressively to 160° C. under nitrogen, with continuous stirring, and kept for 1 h at this temperature. The temperature was then slowly increased up to 190° C. and kept at this temperature for 3 h and the reaction water thereby produced was continuously removed by distillation. Then the heater was stopped and the adduct was let to cool down to room temperature. The day after the temperature was progressively increased to 160° C. under nitrogen and 0.015 g of tetra-n-butyl titanate in solution in 0.29 g of monoethylene glycol was introduced in the adduct. Then the temperature was increased progressively to 190° C. The column was then removed, and the pressure was reduced below 50 mbar for 4 h, under continuous stirring. A first sample is taken from the flask.

Then 1.2 g of Nexamite A99, corresponding to 1% w of the polymer remaining in the flask, is added and the temperature is kept at 190° C., under nitrogen, for 15 min with continuous stirring. After cooling, glassy polymers were obtained, with the following analytical data:

The acid and hydroxyl numbers were respectively 8.8 mgKOH/g and 43.4 mgKOH/g, corresponding to about n=5. The acid and hydroxyl numbers of the first sample, prior to the addition of Nexamite A99, were respectively 14.6 mgKOH/g and 44.1 mgKOH/g, corresponding to about n=5. Thus the addition of Nexamite A99 enabled to decrease selectively the acid number below 10 mgKOH/g.

Example 33 (Production of a Phosphorous Containing Polyester According to the Invention)

393.0 g (1.135 mol) of Lunastab DDP and 147.8 g (1.419 mol) of Neopentylglycol were poured in a stainless steal reactor equipped with a mechanical stirrer with vacuum/nitrogen inlet and a distillation column followed by a condenser and several temperature and pressure sensor. The temperature was increased progressively up to 240° C. under nitrogen, with continuous stirring, and kept for 30 min at this temperature; then the pressure was decreased down to 100 mbar in 30 min, and the reaction water thereby produced was continuously removed by distillation. The vacuum was broken, and 0.039 g of tetra-n-butyl titanate in solution in 0.79 g of monoethylene glycol was introduced in the adduct. Then the pressure was reduced below 50 mbar for 3 h30, under continuous stirring. Finally, the reactor was purged and the polymer let cool down. A glassy polymer was obtained, with the following analytical data:

The acid and hydroxyl numbers were respectively 5.1 mgKOH/g and 41.8 mgKOH/g, corresponding to about n=6.

Comparative Example 1 (CE1; Production of a Phosphorous Containing Polyester)

Similarly, to Example 1, 103.9 g (0.300 mol) of Lunastab DDP and 23.3 g (0.375 mol) of monoethyleneglycol were polycondensated.

The polymer thus obtained had the following analytical data:

The amorphous polyester had a glass transition temperature of 86° C., and a thermal degradation onset of 406° C.

The acid and hydroxyl numbers were respectively 2.7 mgKOH/g and 14.2 mgKOH/g, corresponding to a mole fraction of repeating unit of about n=18.

The phosphorous content was 8.1% w.

Comparative Example 2 (CE2, Production of a Phosphorous Containing Polyester)

Similarly, to Example 1, 103.9 g (0.300 mol) of Lunastab DDP and 28.5 g (0.375 mol) of 1,3-propanediol were polycondensated.

The polymer thus obtained had the following analytical data:

The amorphous polyester had a glass transition temperature of 69° C., and a thermal degradation onset of 388° C.

The acid and hydroxyl numbers were respectively 0.8 mgKOH/g and 42.3 mgKOH/g, corresponding to a mole fraction of repeating unit of about n=7.

The phosphorous content was 7.6% w.

Comparative Example 3 (CE3, Production of a Phosphorous Containing Polyester)

Similarly, to Example 1, 103.9 g (0.300 mol) of Lunastab DDP and 28.5 g (0.375 mol) of 1,2-propanediol were polycondensated.

The polymer thus obtained had the following analytical data:

The amorphous polyester had a glass transition temperature of 85° C., and a thermal degradation onset of 364° C.

The acid and hydroxyl numbers were respectively 5.6 mgKOH/g and 20.2 mgKOH/g, corresponding to a mole fraction of repeating unit of about n=11.

The phosphorous content was 7.9% w.

Comparative Example 4 (CE4; Production of a Phosphorous Containing Polyester)

Similarly, to Example 1, 103.9 g (0.300 mol) of Lunastab DDP and 33.8 g (0.375 mol) of 1,2-Butanediol were polycondensated.

The polymer thus obtained had the following analytical data:

The amorphous polyester had a glass transition temperature of 81° C., and a thermal degradation onset of 360° C.

The acid and hydroxyl numbers were respectively 15.6 mgKOH/g and 7.5 mgKOH/g, corresponding to a mole fraction of repeating unit of about n=12.

The phosphorous content was 7.4% w.

Comparative Example 5 (CE5; Production of a Phosphorous Containing Polyester)

Similarly, to Example 1, 103.9 g (0.300 mol) of Lunastab DDP and 29.7 g (0.330 mol) of 1,4-Butanediol were polycondensated.

The polymer thus obtained had the following analytical data:

The acid and hydroxyl numbers were respectively 73.2 mgKOH/g and 5.2 mgKOH/g, corresponding to a mole fraction of repeating unit of about n=4.

The phosphorous content was 7.5% w.

Comparative Example 51 (CE51, Production of a Phosphorous Containing Polyester)

Similarly to Example 1, 103.9 g (0.300 mol) of Lunastab DDP and 31.9 g (0.270 mol) of 1,6-hexanediol were polycondensated. After cooling, a glassy polymer was obtained. The polymer thus obtained had the following analytical data:

The acid and hydroxyl numbers were respectively 29.7 mgKOH/g and 3.2 mgKOH/g, corresponding to about n=8.

The phosphorous content was 7.2% w.

Preparation at Lab-Scale of Melt Blends for Spinning Applications

Example 4 (Preparation of a Flame Retardant Melt Blend According to the Invention)

The PA66 pellets were dried at 90 degrees centigrade in a vacuum oven for one night. A 10 g dry blend was then prepared with PA66 and the phosphorous containing polymer of Example 1, with the corresponding ratio 94%/6% by weight for approx. 0.5% weight of phosphorous in the final composition. The production of the melt blend was effected by melt blending with a twin screw microcompounder Xplore, equipped with a recycling channel and a water cooling bath. The time of melt blending prior to extrusion was set to 9 minutes, and the melt temperature of the mass was 280° C. The force applied to the screw is related to the melt viscosity. It was just after loading (1203 N) and at the end of the melt blending (1193 N). The amino end-groups concentration on the blending was measured at 21 meq/kg.

Example 5 (Preparation of a Flame Retardant Melt Blend According to the Invention)

Similarly to Example 4, PA66 and the phosphorous containing polymer of Example 2 were melt blended, with the corresponding ratio 94%/6% by weight. The force applied to the screw was just after loading (1233 N) and at the end of the melt blending (1298 N). The amino end-groups concentration on the blending was measured at 17 meq/kg.

Example 6 (Preparation of a Flame Retardant Melt Blend According to the Invention)

Similarly to Example 4, PA66 and the phosphorous containing polymer of Example 3 were melt blended, with the corresponding ratio 94%/6% by weight. The force applied to the screw was just after loading (1083 N) and at the end of the melt blending (1015 N). The amino end-groups concentration on the blending was measured at 20 meq/kg.

Reference Example (Preparation of a Melt Blend without Containing a Phosphorous-Containing Polymer)

Similarly to Example 4, 10 g of PA66 were melt blended. The force applied to the screw was just after loading (984 N) and at the end of the melt blending (1052 N). The amino end-groups concentration on the blending was measured at 21 meq/kg.

Comparative Example 6 (CE6, Preparation of a Flame Retardant Melt Blend)

Similarly to Example 4, PA66 and Ukanol FR80 were melt blended, with the corresponding ratio 94%/6% by weight. The force applied to the screw was just after loading (960 N) and at the end of the melt blending (215 N). The amino end-groups concentration on the blending was measured at 2 meq/kg.

Comparative Example 7 (CE7, Preparation of a Flame Retardant Melt Blend)

Similarly to Example 4, PA66 and the phosphorous containing polymer of Comparative Example 1 (CE1) were melt blended, with the corresponding ratio 94%/6% by weight. The force applied to the screw was just after loading (990 N) and at the end of the melt blending (220 N). The amino end-groups concentration on the blending was measured at 0 meq/kg.

Comparative Example 8 (CE8, Preparation of a Flame Retardant Melt Blend)

Similarly to Example 4, PA66 and the phosphorous containing polymer of Comparative Example 2 (CE2) were melt blended, with the corresponding ratio 94%/6% by weight. The force applied to the screw was just after loading (1175 N) and at the end of the melt blending (690 N). The amino end-groups concentration on the blending was measured at 6 meq/kg.

Comparative Example 9 (CE9, Preparation of a Flame Retardant Melt Blend)

Similarly to Example 4, PA66 and the phosphorous containing polymer of Comparative Example 3 (CE3) were melt blended, with the corresponding ratio 94%/6% by weight. The force applied to the screw was just after loading (868 N) and at the end of the melt blending (93 N). The amino end-groups concentration on the blending was measured at 0 meq/kg.

Comparative Example 10 (CE10, Preparation of a Flame Retardant Melt Blend)

Similarly to Example 4, PA66 and the phosphorous containing polymer of Comparative Example 4 (CE4) were melt blended, with the corresponding ratio 94%/6% by weight. The force applied to the screw was just after loading (800 N) and at the end of the melt blending (90 N). The amino end-groups concentration on the blending was measured at 2 meq/kg.

Comparative Example 11 (CE11, Preparation of a Flame Retardant Melt Blend)

Similarly to Example 4, PA66 and the phosphorous containing polymer of Comparative Example 5 (CE5) were melt blended, with the corresponding ratio 94%/6% by weight. The force applied to the screw was just after loading (705 N) and at the end of the melt blending (223 N). The amino end-groups concentration on the blending was measured at 1 meq/kg.

Comparative Example 111 (CE111, Preparation of a Flame Retardant Melt Blend)

Similarly to Example 4, PA66 and the phosphorous containing polymer of Comparative Example 51 (CE51) were melt blended, with the corresponding ratio 94%/6% by weight. The force applied to the screw was just after loading (1100 N) and at the end of the melt blending (638 N). The amino end-groups concentration on the blending was measured at 3 meq/kg.

The Table 1 reports the evolutions of the forces applied to the screw, which are related to the melt viscosity of the blends.

TABLE 1

| Blend | Initial force [N] | Final force [N] | Variation [N] | Force retention |
|---|---|---|---|---|
| Reference | 984 | 1052 | 68 | 107% |
| CE6 | 960 | 215 | −745 | 22% |
| CE7 | 990 | 220 | −770 | 22% |
| CE8 | 1175 | 690 | −485 | 59% |
| CE9 | 868 | 93 | −775 | 11% |
| CE10 | 800 | 90 | −710 | 11% |
| CE11 | 705 | 223 | −482 | 32% |
| CE111 | 1100 | 638 | −462 | 58% |
| Ex. 4 | 1203 | 1193 | −10 | 99% |
| Ex. 5 | 1233 | 1298 | 65 | 105% |
| Ex. 6 | 1083 | 1015 | −68 | 94% |

As can be seen from the results of Table 1, the melt blending of polyamide with phosphorous-containing polymer from the prior art impart a dramatic drop of the force and the melt viscosity of the blends, whereas the polyamide compositions of the invention keep the force and the melt viscosity of the blends at an appropriate level, closer to the reference PA66 blend.

In addition, only the polyamide compositions of the invention maintain an amino end-group concentration (AEG) close to the reference PA66, which is critical for the dyeing ability of the yarn.

Preparation at Lab-Scale of Melt Blends for Molding Applications

Example 7 (Preparation of a Flame Retardant Melt Blend According to the Invention)

The PA66 pellets were dried at 90 degrees centigrade in a vacuum oven for one night. A 10 g dry blend was then prepared with PA66 and the phosphorous containing polymer of Example 2, with the corresponding ratio 86%/14% by weight for about 1.0% weight of phosphorous in the final composition. The production of the melt blend was effected by melt blending with a twin screw microcompounder Xplore, equipped with a recycling channel and a water cooling bath. The time of melt blending prior to extrusion was set to 4 minutes, and the melt temperature of the mass was 280° C. The force applied to the screw is related to the melt viscosity. It was after 2 minutes (518 N) and at the end of the melt blending (480 N).

Example 8 (Preparation of a Flame Retardant Melt Blend According to the Invention)

Similarly to Example 7, PA66 and the phosphorous containing polymer of Example 2 were melt blended, with the corresponding ratio 79%/21% by weight for about 1.5% weight of phosphorous in the final composition. The force applied to the screw was after 2 minutes (213 N) and at the end of the melt blending (210 N).

Comparative Example 12 (CE12, Preparation of a Flame Retardant Melt Blend)

Similarly to Example 7, PA66 and Ukanol FR80 were melt blended, with the corresponding ratio 87%/13% by weight for about 1.0% weight of phosphorous in the final composition. The force applied to the screw was after 2 minutes (418 N) and at the end of the melt blending (215 N).

Comparative Example 13 (CE13, Preparation of a Flame Retardant Melt Blend)

Similarly to Example 8, PA66 and Ukanol FR80 were melt blended, with the corresponding ratio 81%/19% by weight for about 1.5% weight of phosphorous in the final composition. The force applied to the screw was after 2 minutes (145 N) and at the end of the melt blending (40 N).

The Table 2 reports the evolutions of the forces applied to the screw, which are related to the melt viscosity of the blends.

TABLE 2

| Blend | Force at 2 min [N] | Force at 4 min [N] | Variation [N] | Force retention |
|---|---|---|---|---|
| CE12 | 418 | 215 | −203 | 51% |
| CE13 | 268 | 145 | −123 | 54% |
| Ex. 7 | 518 | 480 | −38 | 93% |
| Ex. 8 | 213 | 210 | −3 | 99% |

As can be seen from the Table 2, the melt blending of polyamide with phosphorous-containing polymer from the prior art impart a dramatic drop of the force and the melt viscosity of the blends, whereas the polyamide compositions of the invention keep the force and the melt viscosity of the blends in a much stable manner, assessing an appropriate process stability for molding applications.

Preparation at Pilot-Scale of Fiber by Melt Spinning

Example 34 (Production of a PA66 Flame-Retardant Fiber According to the Invention)

PA66 and the phosphorous containing polymer of example 33 (E33) were melt blended in a twin screw extruder with terminal zone set at 280° C., in respective ratio 93.5%/6.5% in weight. The strand was cooled in a water bath and pelletized. The pellets had a water content of 0.15%, and a phosphorous content of 0.5% w.

The pellets were used to feed the single-screw extruder of a spinning pilot, running at 1 kg/h and 450 m/min. The terminal zone of the single screw extruder, the temperature of the pack and the temperature of the die were set at 275° C. The sizing used was Delion F5103, 1% w on the fiber.

The viscosity number of the fiber obtained was VN=118 mL/g.

Comparative Example 14 (CE14, Production of a PA66 Flame-Retardant Fiber)

Similarly to example 34 (E34), PA66 and Ukanol FR80 were melt blended in a twin screw extruder with terminal zone set at 280° C., in respective ratio 94.0%/6.0% in weight. The strand was cooled in a water bath and pelletized. The pellets had a water content of 0.15%, and a phosphorous content of 0.5% w.

The pellets were used to feed the single-screw extruder of a spinning pilot. It was difficult to spin properly because the melt was very fluid.

The viscosity number of the fiber obtained was VN=83 mL/g.

Reference Example 2 (RE2, Production of a PA66 Fiber)

Similarly to example 34 (E34), PA66 pellets were used to feed the single-screw extruder of a spinning pilot.

The viscosity number of the fiber obtained was VN=132 mL/g.

Thus, the fiber of E34, prepared with the polymer according to the invention, has a viscosity number close to the reference fiber RE2. On the contrary the fiber of CE14 has a very low viscosity number, far from the reference fiber, and was difficult to spin.

The invention claimed is:

1. A thermoplastic polymer composition comprising a polyamide and a phosphorous-containing polymer, wherein the phosphorous-containing polymer is obtained by polycondensation of a) at least one phosphorous-containing monomer selected from adducts of a1) 9,10-dihydro-9-oxa-10-phosphaphenanthrene-10-oxide (DOPO) and/or nuclear substituted DOPO derivatives, with a2) at least one unsaturated di- or multivalent carboxylic acid or ester or anhydride thereof;

b) at least one divalent alcohol comprising an alkyl, cycloalkyl or alkylaryl backbone with 4 to 16 carbon atoms and with a main carbon chain of at least three carbon atoms between the hydroxyl groups of the divalent alcohol; and c) optionally other monomers, said other monomers being other than unsaturated di- or multivalent carboxylic acids, and wherein the amount of acid end-groups present in the phosphorous-containing polymer is lower than the amount of hydroxyl end-groups present in said polymer.

2. The thermoplastic polymer composition according to claim 1, wherein the polyamide is selected from the group consisting of PA 6, PA 10, PA 11, PA 12, PA 6.6, PA 6.9, PA 4.6, PA 4.10, PA 5.10, PA 6.10, PA 6.12, PA 6.14, PA 10.10, PA 10.12, PA 10.14, PA 10.18, PA 12.12, PA 6.18, PA 6.36, PA 9.T, PA 6.T, PA 6.I, PA 10.T, PA PACM.6, PA MPMD.10, MPMD.6/MPMD.T, PA IPD.6, blends thereof and copolymers based on these polyamides.

3. The thermoplastic polymer composition according to claim 1, wherein the unsaturated di- or multivalent carboxylic acid or ester or anhydride thereof is selected from the group consisting of itaconic acid, maleic acid, fumaric acid, endomethylene tetrathydrophthalic acid, citraconic acid, mesaconic acid, and tetrathydrophthalic acid and esters and anhydrides thereof.

4. The thermoplastic polymer composition according to claim 1, wherein the divalent alcohol is selected from the group consisting of 1,4-butanediol, 1,3-butanediol, 1,5-pentanediol, neopentylglycol, 1,5-hexanediol, 1,6-hexanediol, 1,7-heptanediol, 2,2-diethyl-1,3-propanediol, 2-methyl-2-propyl-1,3-propanediol, 1,8-octanediol, 2,2,4-trimethyl-1,3-pentanediol, 2-ethyl-1,3-hexanediol, 1,9-nonanediol, 2-butyl-2-ethyl-1,3-propanediol, 1,10-decanediol, 2,2-dibutyl-1,3-propanediol, 1,12-dodecanediol, 1,14-tetradecanediol, 1,16-hexadecanediol, 1,4-cyclohexanediol, 1,3-cyclohexanediol, 1,4-cyclohexanedimethanol, 2,2,4,4-tetramethyl-1,3-cyclobutanediol, 2-phenyl-1,3-propanediol, 2-phenyl-1,2-propanediol, 1,2-benzenedimethanol, 1,3-benzenedimethanol, 1,4-benzenedimethanol and mixtures thereof.

5. The thermoplastic polymer composition according to claim 1, wherein the amount of acid end-groups present in the phosphorous-containing polymer is less than 10 mg KOH/g and the amount of hydroxyl end-groups present in the polymer is at least 5 mg KOH/g, determined by titration in pyridine with NaOH.

6. The thermoplastic polymer composition according to claim 1, wherein the phosphorous-containing polymer is a polyester, which has a mole fraction of ester repeating units of at least 5.

7. The thermoplastic polymer composition according to claim 1, wherein the phosphorous-containing polymer has an average molecular weight Mn between 1000 and 20,000.

8. The thermoplastic polymer composition according to claim 1, wherein the thermoplastic polymer composition comprises at least 70% by weight of the polyamide and at least 1% by weight of the phosphorous-containing polymer, based on the total weight of the composition.

9. The thermoplastic polymer composition according to claim 1, wherein the thermoplastic polymer composition has an amino-end-group concentration of at least 10 meq/kg determined by potentiometric titration.

10. A method for preparing the thermoplastic polymer composition according to claim 1, wherein i) the phosphorous containing monomer a), which is an adduct of monomer a1) and a2), reacts with divalent alcohol b) and optionally monomer c) such that the amount of acid-end groups is lower than the amount of hydroxyl end-groups present in the phosphorous-containing polymer, and ii) the phosphorous-containing polymer obtained in step i) is mixed with the polyamide.

11. A shaped article comprising the thermoplastic polymer composition according to claim 1.

12. A shaped article comprising the thermoplastic polymer composition according to claim 1, wherein the article is a fiber obtained by melt spinning of said thermoplastic polymer composition.

13. The shaped article according to claim 12, wherein the fiber has a total phosphorous content of from about 0.1% to about 2% by weight.

14. The shaped article according to claim 12, wherein the fiber comprises said thermoplastic polymer composition and at least one dye.

15. A flame-retardant polymer comprising a phosphorous containing polymer in a polyamide composition, wherein the phosphorous-containing polymer is obtained by polycondensation of a) at least one phosphorous-containing monomer selected from adducts of a1) 9,10-dihydro-9-oxa-10-phosphaphenanthrene-10-oxide (DOPO) and/or nuclear substituted DOPO derivatives, with at least one unsaturated di- or multivalent carboxylic acid a2) or ester or anhydride thereof;

b) at least one divalent alcohol comprising an alkyl, cycloalkyl or alkylaryl backbone with 4 to 16 carbon atoms and with a main carbon chain of at least three carbon atoms between the hydroxyl groups of the divalent alcohol; and c) optionally other monomers, said other monomers being other than unsaturated di- or multivalent carboxylic acids, and wherein the amount of acid end-groups present in the polymer is lower than the amount of hydroxyl end-groups present in the polymer.

* * * * *